(12) United States Patent
Sekhon

(10) Patent No.: US 8,405,872 B2
(45) Date of Patent: Mar. 26, 2013

(54) METHOD AND APPARATUS FOR PRINTING ON CUSTOM MEDIA USING AN IMAGE PRODUCTION DEVICE

(75) Inventor: Jasdeep Sekhon, West Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 633 days.

(21) Appl. No.: 12/644,158

(22) Filed: Dec. 22, 2009

(65) Prior Publication Data

US 2011/0149310 A1 Jun. 23, 2011

(51) Int. Cl.
*G06F 15/00* (2006.01)
*G06K 15/00* (2006.01)
(52) U.S. Cl. ........................ 358/1.9; 358/1.18
(58) Field of Classification Search .................. 358/1.9, 358/453, 450, 1.18; 382/305, 296, 180, 294; 707/517, 520, 524, 525
See application file for complete search history.

(56) References Cited

U.S. PATENT DOCUMENTS

| | | | |
|---|---|---|---|
| 6,453,078 B2 * | 9/2002 | Bubie et al. | 382/305 |
| 6,894,791 B1 | 5/2005 | Wheeler | |
| 6,947,159 B1 | 9/2005 | Wheeler | |
| 2009/0024950 A1 | 1/2009 | Salgado et al. | |

* cited by examiner

*Primary Examiner* — Charlotte M Baker
(74) *Attorney, Agent, or Firm* — Ronald E. Prass, Jr.; Prass LLP

(57) ABSTRACT

A method and apparatus for generating a custom media template for printing by an image production device is disclosed and may include receiving a request to generate a custom print preview template, initiating a scan of the custom print preview template document, receiving the scanned custom print preview template, and storing the scanned custom print preview template. A method and apparatus for printing on custom media is also disclosed and may include receiving a request to print a print job, determining whether custom media is required, determining if a request for a print preview has been received, prompting the user to select one of the custom media templates from one or more custom media templates; receiving a custom media template selection presenting the document image on the selected custom media template in a print preview image, determining whether the print job is to be processed, and printing the print job.

20 Claims, 7 Drawing Sheets

METHOD AND APPARATUS FOR PRINTING ON CUSTOM MEDIA USING AN IMAGE PRODUCTION DEVICE

BACKGROUND

Disclosed herein is a method for generating a custom media template for printing by an image production device and a method for printing on custom media using an image production device, as well as a corresponding apparatus.

When printing on pre-printed media stock (such as for checks, W-2s, 1099s, invoices, mailing labels, etc.), a user must manually line up the media stock so that text will print in the proper locations. In conventional image production devices, a user must either create a custom template or download/install a template specific for your pre-printed stock. This process is inefficient because not all companies provide templates for the pre-printed media stock that they sell and even if the templates are available, the user must print a test sheet because the alignment is different for each printer. In this manner, the user must print the test sheet, make any corrections to positioning and then print another test sheet, repeating this process until the content is properly aligned with the custom media stock. This process results in wasted time, pre-printed media stock, ink, etc. and causes the user's frustration level to rise.

SUMMARY

A method and apparatus for generating a custom media template for printing by an image production device is disclosed. The method may include receiving a request to generate a custom print preview template, initiating a scan of the custom print preview template document by the image production device, receiving the scanned custom print preview template from the image production device, and storing the scanned custom print preview template in a memory.

A method and apparatus for printing on custom media using an image production device is also disclosed. The method may include receiving a request to print a print job from a user, the print job involving printing of a document image on media, determining whether custom media is required for the print job, wherein if it is determined that custom media is required for the print job, determining if a request for a print preview has been received from the user, wherein if it is determined that a request for the print preview has been received from the user, prompting the user to select one of the custom media templates from one or more custom media templates stored in a memory receiving the user's custom media template selection and retrieving the selected custom media template from the memory presenting the document image on the selected custom media template in a print preview image on an electronic display, determining whether the user has indicated that the print job is to be processed, wherein if it is determined the user has indicated that the print job is to be processed, printing the print job at the image production device.

DETAILED DESCRIPTION

Figure 1:
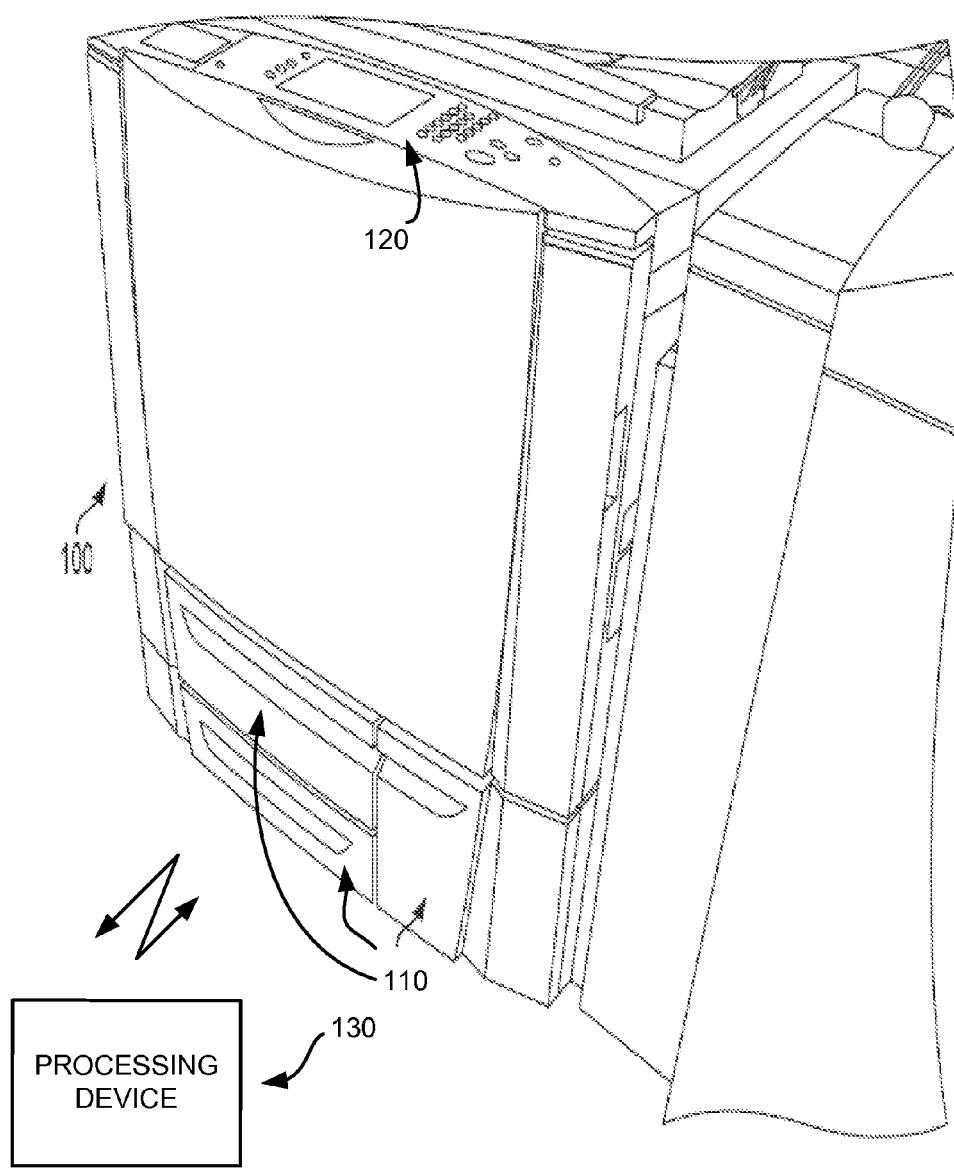
FIG. 1 is an exemplary diagram of an image production device and a processing device in accordance with one possible embodiment of the disclosure.

Aspects of the embodiments disclosed herein relate to a method for generating a custom media template for printing by an image production device and a method for printing on custom media using an image production device, as well as a corresponding apparatus.

The disclosed embodiments may include a method for generating a custom media template for printing by an image production device. The method may include receiving a request to generate a custom print preview template, initiating a scan of the custom print preview template document by the image production device, receiving the scanned custom print preview template from the image production device, and storing the scanned custom print preview template in a memory.

The disclosed embodiments may also include a processing device that generates a custom media template for printing by an image production device. The processing device may include a memory, and a customized print preview processing unit that receives a request to generate a custom print preview template, initiates a scan of the custom print preview template document by the image production device, receives the scanned custom print preview template from the image production device, and stores the scanned custom print preview template in the memory.

The disclosed embodiments may also include a method for printing on custom media using an image production device. The method may include receiving a request to print a print job from a user, the print job involving printing of a document image on media, determining whether custom media is required for the print job, wherein if it is determined that custom media is required for the print job, determining if a request for a print preview has been received from the user, wherein if it is determined that a request for the print preview has been received from the user, prompting the user to select one of the custom media templates from one or more custom media templates stored in a memory receiving the user's custom media template selection and retrieves the selected custom media template from the memory presenting the document image on the selected custom media template in a print preview image on an electronic display, determining whether the user has indicated that the print job is to be processed, wherein if it is determined the user has indicated that the print job is to be processed, printing the print job at the image production device.

The disclosed embodiments may also include a processing device that processes print jobs on custom media using an image production device. The processing device may include a memory, and a customized print preview processing unit that receives a request to print a print job from a user, the print job involving printing of a document image on media, determines whether custom media is required for the print job, wherein if the customized print preview processing unit determines that custom media is required for the print job, the customized print preview processing unit determines if a request for a print preview has been received from the user, wherein if the customized print preview processing unit determines that a request for the print preview has been received from the user, prompts the user to select one of the custom media templates from one or more custom media templates stored in the memory, receives the user's custom media template selection and retrieving the selected custom media template from the memory, presents the document image on the selected custom media template in a print preview image on an electronic display, determines whether the user has indicated that the print job is to be processed, wherein if the customized print preview processing unit determines the user has indicated that the print job is to be processed, the customized print preview processing unit prints the print job at the image production device.

The disclosed embodiments may concern a method and apparatus for generating a custom media template and then printing on the custom media using an image production device. The disclosed embodiments may include a print driver that may allow a user to select a pre-scanned image of custom media stock from the print driver dialog box in a printer user interface to use for generating a print preview. This print preview can be shown directly in the print driver user interface or it can be output to a file (PDF, TIFF, etc.), for example. The file that is generated using this method may be a faithful representation of what the document may appear when it is printed onto the custom media stock. Thus, the disclosed embodiments may provide the ability to generate a print preview that combines the pre-scanned document image content with the custom media template.

The disclosed embodiments may be applicable to all existing print drivers for specific image production devices and for universal print drivers that can be used with one or more image production devices. As a result of generating custom media templates and having the print preview capability on the custom media templates, the user's printing experience may be improved by the saving of time and effort and consequently, the saving of money.

In this manner, custom media stock may be scanned at the print device and an electronic image of the custom media may be generated resulting in a custom media template and the template may be stored in memory. The user may then create a document in any document management software (such as Word, Excel, PowerPoint, uDirect, etc.).

If the user desires to print the document onto the custom media, then the user may elect to preview the document as it would be printed on the custom media template using a printer user interface, for example. The user may select a custom media template from one or more custom media templates using a file browsing function, for example. The user may the click a "Preview" button, for example, to generate an image of how the document may appear when printed onto the custom media template. The user may elect to print the document onto the custom media template or adjust the image so that it aligns with the template.

FIG. 1 is an exemplary diagram of an image production device 100 and a processing device 130 in accordance with one possible embodiment of the disclosure. The image production device 100 may be any device that may be capable of making image production documents (e.g., printed documents, copies, etc.) including a copier, a printer, a facsimile device, and a multi-function device (MFD), for example.

The image production device 100 may include one or more media trays 110 and a local user interface 120. The one or more media trays 110 may be opened by a user so that media may be checked, replaced, or to investigate a media misfeed or jam, for example. The media in the media trays 110 may be any type, color, size or thickness, for example.

The user interface 120 may contain one or more display screen (which may be a touchscreen or simply a display, for example), and a number of buttons, knobs, switches, etc. to be used by a user to control image production device 100 operations. The one or more display screen may also display warnings, alerts, instructions, and information to a user. While the user interface 120 may accept user inputs, another source of image data and instructions may include inputs from any number of computers to which the printer is connected via a network, for example.

The processing device 130 may represent any processing device, including a computer, server, laptop, personal digital assistant (PDA), mobile telephone, MP3 player, combinations thereof, or other similar device capable of initiating print commands using a print driver.

Figure 2:
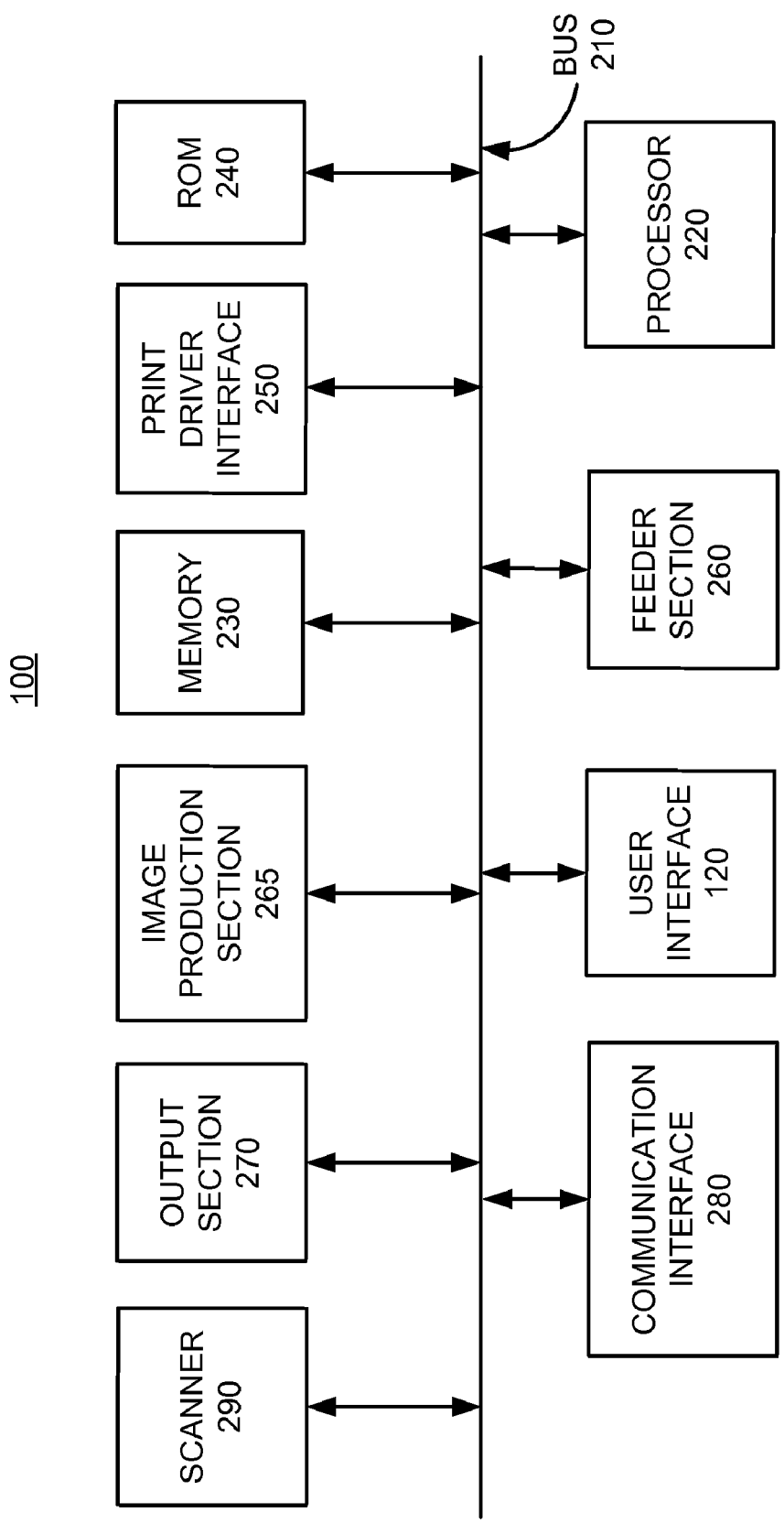
FIG. 2 is an exemplary block diagram of the image production device in accordance with one possible embodiment of the disclosure.

FIG. 2 is an exemplary block diagram of the image production device 100 in accordance with one possible embodiment of the disclosure. The image production device 100 may include a bus 210, a processor 220, a memory 230, a read only memory (ROM) 240, the media tray selection unit 250, the user interface 120, a feeder section 260, an image production section 265, an output section 270, a communication interface 280, and scanner 290. Bus 210 may permit communication among the components of the image production device 100.

The image production section 265 may include hardware by which image signals are used to create a desired image. The stand-alone feeder section 260 may store and dispense media sheets on which images are to be printed. The output section 270 may include hardware for stacking, folding, stapling, binding, etc., prints which are output from the image production section. If the image production device 100 is also operable as a copier, the image production device 100 may further includes a document feeder and scanner which may operate to convert signals from light reflected from original hard-copy image into digital signals, which are in turn processed to create copies with the image production section 265.

With reference to feeder section 260, the section may include one or more media trays, each of which stores a media stack or print sheets ("media") of a predetermined type (size, weight, color, coating, transparency, etc.) and may include a feeder to dispense one of the media sheets therein as instructed.

Certain types of media may require special handling in order to be dispensed properly. For example, heavier or larger media may desirably be drawn from a media stack by use of an air knife, fluffer, vacuum grip or other application (not shown in the Figure) of air pressure toward the top sheet or sheets in a media stack. Certain types of coated media may be advantageously drawn from a media stack by the use of an application of heat, such as by a stream of hot air (not shown in the Figure). Sheets of media drawn from a media stack on a selected media tray may then be moved to the image production section 265 to receive one or more images thereon. Then, the printed sheet is then moved to output section 270, where it may be collated, stapled, folded, hole punched, etc., with other media sheets in manners familiar in the art. Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM 240 and may include any type of storage media, such as, for example, magnetic or optical recording media and its corresponding drive.

User interface 120 may include one or more conventional mechanisms that permit a user to input information to and interact with the image production device 100, such as a keyboard, a display, a mouse, a pen, a voice recognition device, touchpad, buttons, etc., for example. Output section 270 may include one or more conventional mechanisms that output image production documents to the user, including output trays, output paths, finishing section, etc., for example. The image production section 265 may include an image printing and/or copying section, a scanner, a fuser, etc., for example.

Print driver interface 250 may permit the image processing device 100 to communicate with one or more processing devices 130 to allow documents to be properly printed using desired document parameters, such as format (image size, one-sided/two-sided, collated, etc.), media tray, media stock, finishing, etc. In this manner, the user may select the desired document parameters using the print driver for the particular image production device 100 through a printer user interface on a processing device 130 display. The user's desired document parameters may then be sent electronically to the image production device 100 and implemented.

The scanner 290 may be any scanning device known to one of skill in the art that is capable of capturing a document image in a format that may be presented on an electronic display to a user. For example, a flat-bed or document-fed scanned may be installed and used by the image production device 100.

The image production device 100 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

Figure 3:
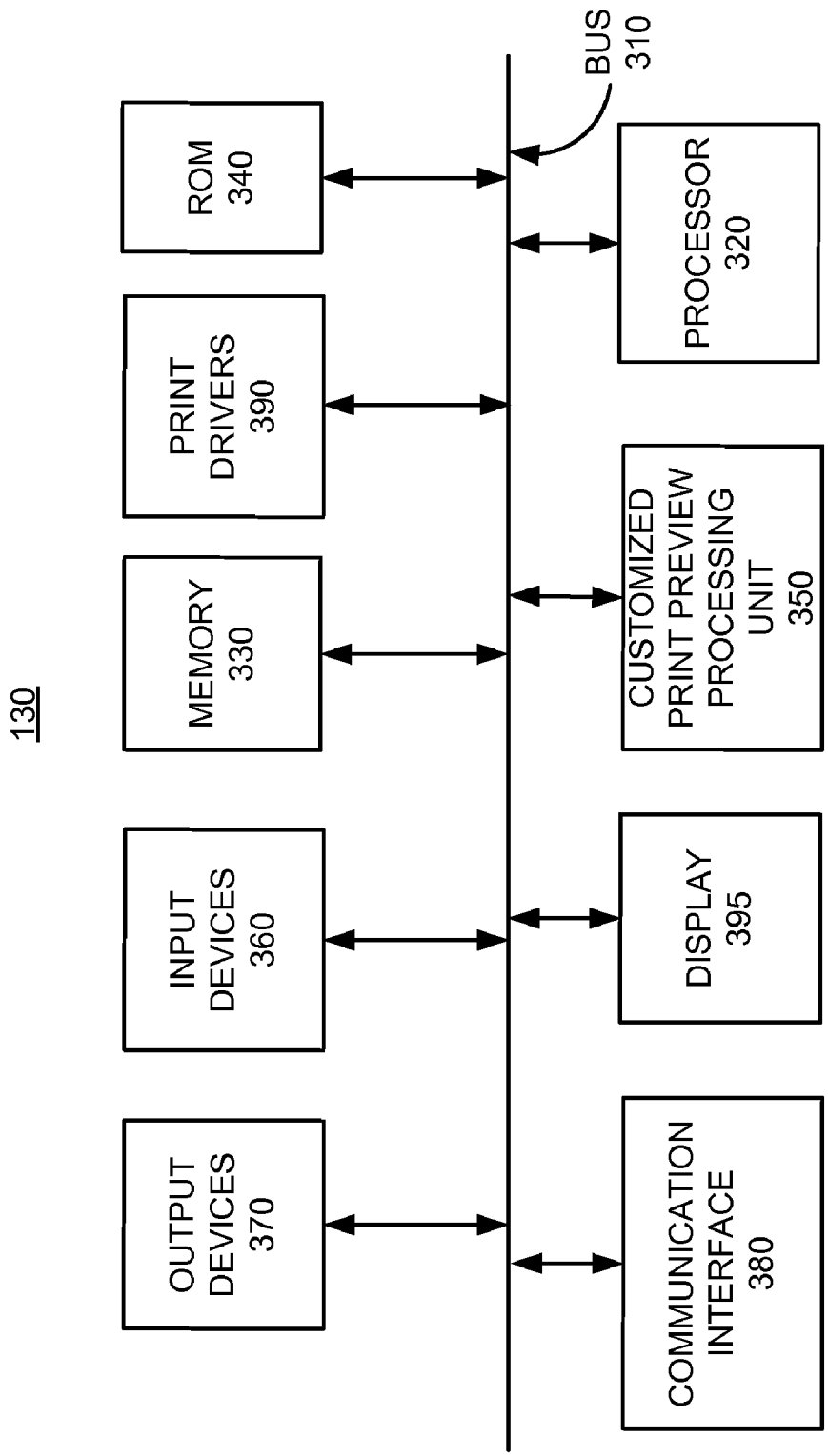
FIG. 3 is an exemplary block diagram of the processing device in accordance with one possible embodiment of the disclosure.

FIG. 3 is an exemplary block diagram of the processing device 130 in accordance with one possible embodiment of the disclosure. The processing device 130 may include bus 310, processor 320, memory 330, read only memory (ROM) 340, the customized print preview processing unit 350, input devices 360, output devices 370, communication interface 380, and one or more print drivers 390. Bus 310 may permit communication among the components of the processing device 130.

Processor 320 may include at least one conventional processor or microprocessor that interprets and executes instructions. Memory 330 may be a random access memory (RAM) or another type of dynamic storage device that stores information and instructions for execution by processor 320. Memory 330 may also store temporary variables or other intermediate information used during execution of instructions by processor 320. ROM 340 may include a conventional ROM device or another type of static storage device that stores static information and instructions for processor 320. Memory 330 may also represent any storage device that may include any type of media, such as, for example, magnetic or optical recording media and its corresponding drive.

Input devices 360 may include one or more conventional mechanisms that permit a user to input information to the processing device 130, such as a keyboard, a mouse, a pen, a voice recognition device, etc. Output devices 370 may include one or more conventional mechanisms that output information to the user, including a display, a printer, one or more speakers, or a medium, such as a memory, or a magnetic or optical disk and a corresponding disk drive.

Communication interface 380 may include any transceiver-like mechanism that enables the processing device 130 to communicate via a network. For example, communication interface 380 may include a modem, or an Ethernet interface for communicating via a local area network (LAN). Alternatively, communication interface 380 may include other mechanisms for communicating with other devices and/or systems via wired, wireless or optical connections. In some implementations of the processing device 130, communication interface 380 may not be included in the exemplary processing device 130 when the customized print preview process is implemented completely within the processing device 130.

The processing device 130 may perform such functions in response to processor 320 by executing sequences of instructions contained in a computer-readable medium, such as, for example, memory 330, a magnetic disk, or an optical disk. Such instructions may be read into memory 330 from another computer-readable medium, such as a storage device, or from a separate device via communication interface 380.

One or more print drivers 390 may be stored in memory 330, for example. A print driver 390 may provide instructions that are typically unique to each specific type of printer or universally unique to more than one type of printer. Thus, the processing device 130 may store and retrieve a plurality of print drivers 390 for different printers that may be available to the user in memory 330. The print driver 390 may allow the processing device 130 to communicate instructions, document images/data, document settings, etc. to image production device 100 so that the image production device 100 may understand the instructions, document images/data, document settings, etc.

The image production device 100 and the processing device 130 illustrated in FIGS. 1-3 and the related discussion are intended to provide a brief, general description of a suitable computing environment in which the disclosure may be implemented. Although not required, the disclosure will be described, at least in part, in the general context of computer-executable instructions, such as program modules, being executed by the image production device 100 or the processing device 130, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

For illustrative purposes, the operation of the customized print preview processing unit 350 and the custom media template generation process and the custom media printing process will be described below in relation to the diagrams shown in FIGS. 1-3.

Figure 4:
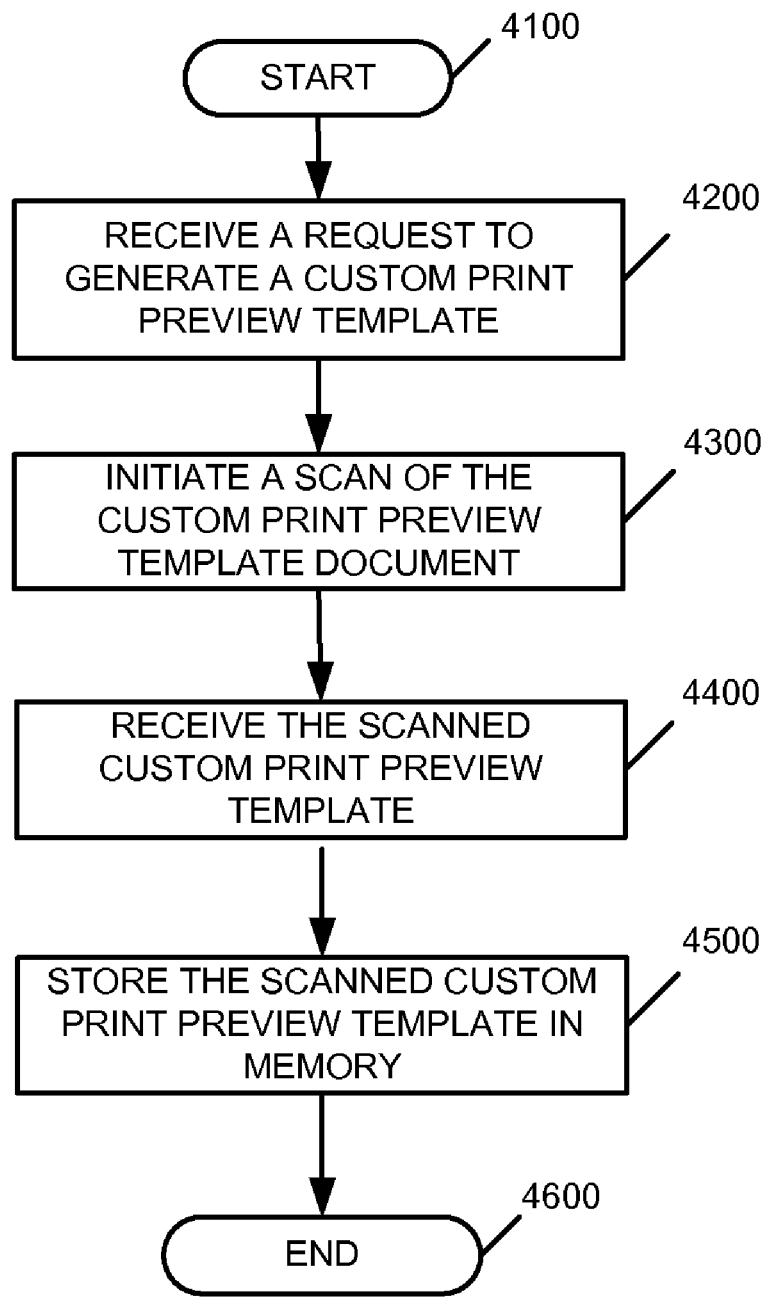
FIG. 4 is a flowchart of an exemplary custom media template generation process in accordance with one possible embodiment of the disclosure.

FIG. 4 is a flowchart of an exemplary custom media template generation process in accordance with one possible embodiment of the disclosure. The method may begin at step 4100, and may continue to step 4200 where the customized print preview processing unit 350 may receive a request to generate a custom print preview template. The customized print preview processing unit 350 may receive the request to generate the custom print preview template through the printer user interface, for example.

At step 4300, the customized print preview processing unit 350 may initiate a scan of the custom print preview template document by the image production device 100. The custom print preview document may be scanned by the scanner 290, for example. The custom print preview document may be any custom media document on which data and images may have to be printed in certain area for the custom media, including letterhead, checks, W-2s, 1099s, invoices, mailing labels, envelopes, greeting or announcement cards, business cards, forms, etc., for example.

At step 4400, the customized print preview processing unit 350 may receive the scanned custom print preview template from the image production device 100. At step 4500, the customized print preview processing unit 350 may store the scanned custom print preview template in the memory 330. The customized print preview processing unit 350 may also display the received scanned custom print preview template to a user on the electronic display. The customized print preview processing unit 350 may transmit the custom print preview template to another processing device for use by that device. The process may then go to step 4600 and end.

Figure 5:
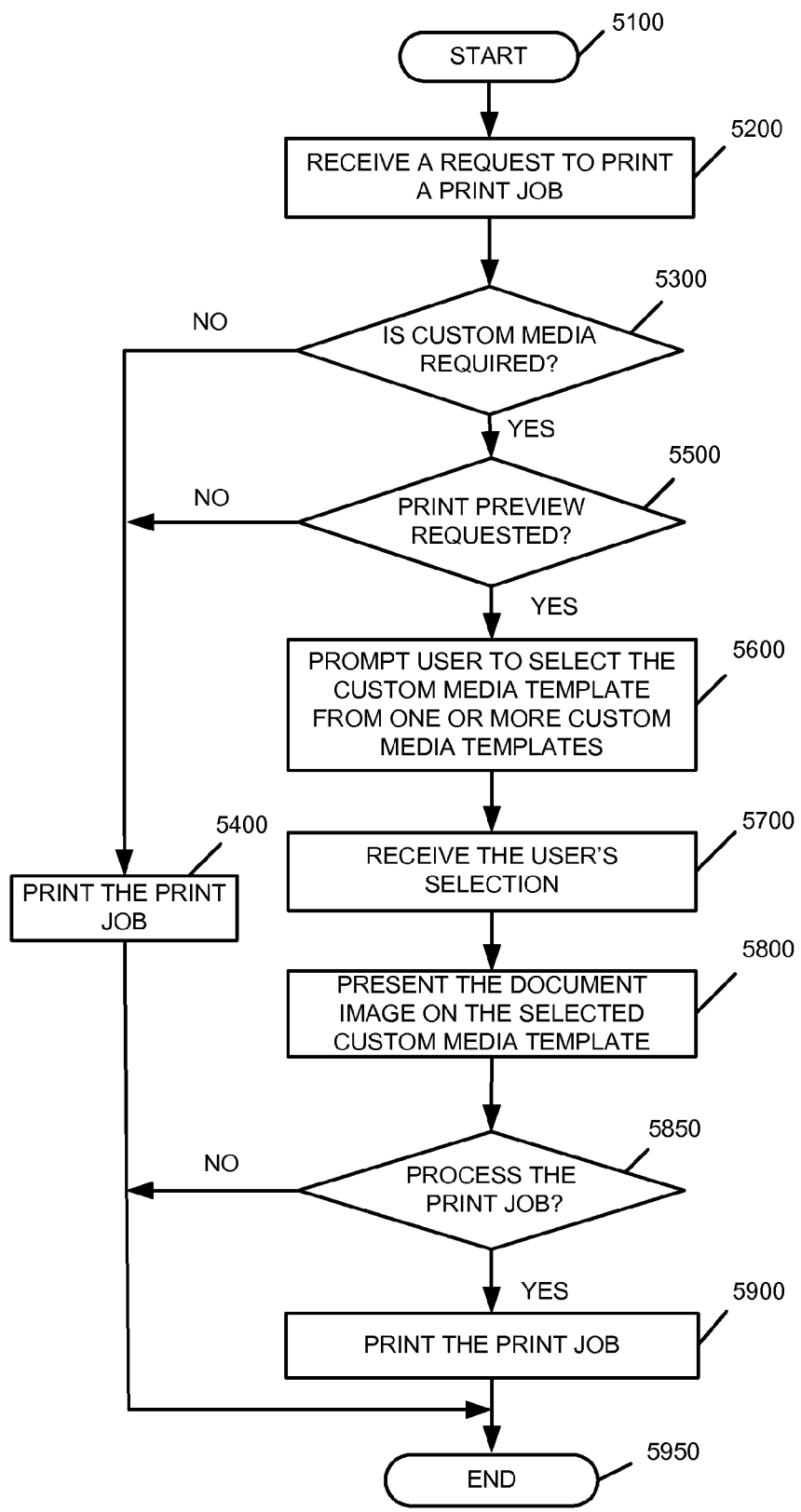
FIG. 5 is a flowchart of an exemplary custom media printing process in accordance with one possible embodiment of the disclosure.

FIG. 5 is an exemplary flowchart illustrating the custom media printing process in accordance with one possible embodiment of the disclosure. The method may begin at step 5100, and may continue to step 5200 where the customized print preview processing unit 350 may receive a request to print a print job from a user. The print job may involve printing of a document image on media.

At step 5300, the customized print preview processing unit 350 may determine whether custom media is required for the print job. If the customized print preview processing unit 350 determines that custom media is not required for the print job, the process may go to step 5400 and the customized print preview processing unit 350 may print the print job. The process may then go to step 5950 and end.

If at step 5300, the customized print preview processing unit 350 determines that custom media is required for the print job, at step 5500 the customized print preview processing unit 350 may determine if a request for a print preview has been received from the user. In this manner, the customized print preview processing unit 350 may receive the print preview request from the printer user interface. If the customized print preview processing unit determines that a request for the print preview has not been received from the user, the process may go to step 5400 and the customized print preview processing unit 350 may print the print job. The process may then go to step 5600 and end.

If at step 5500, the customized print preview processing unit 350 determines that a request for the print preview has been received from the user, at step 5600 the customized print preview processing unit 350 may prompt the user to select one of the custom media templates from one or more custom media templates stored in the memory 330.

At step 5700, the customized print preview processing unit 350 may receive the user's custom media template selection and retrieve the selected custom media template from the memory 330. In this manner, the customized print preview processing unit 350 may receive the custom media template selection from the printer user interface. At step 5800, the customized print preview processing unit 350 may present the document image on the selected custom media template in a print preview image on an electronic display.

At step 5850, the customized print preview processing unit 350 may determine whether the user has indicated that the print job is to be processed. If the customized print preview processing unit 350 determines the user has indicated that the print job is not to be processed, the process may then go to step 5950 and end. However, if the customized print preview processing unit 350 determines that the user indicates that the print job is not to be processed, the customized print preview processing unit 350 may receive an adjusted document image. The customized print preview processing unit 350 may then present the adjusted document image on the selected custom media template in a print preview image and determine whether the user has indicated that the print job is to be processed with the adjusted document image. If the customized print preview processing unit 350 determines that the user has indicated that the print job is to be processed, the customized print preview processing unit 350 may print the print job at the image production device 100. Note that if the adjusted document image on the custom media template is still unsatisfactory, the user may elect to make further adjustments to the document image and repeat the process.

If at step 5850 the customized print preview processing unit 350 determines the user has indicated that the print job is to be processed, the customized print preview processing unit prints the print job at the image production device 100. The process may then go to step 5950 and end.

Figure 6:
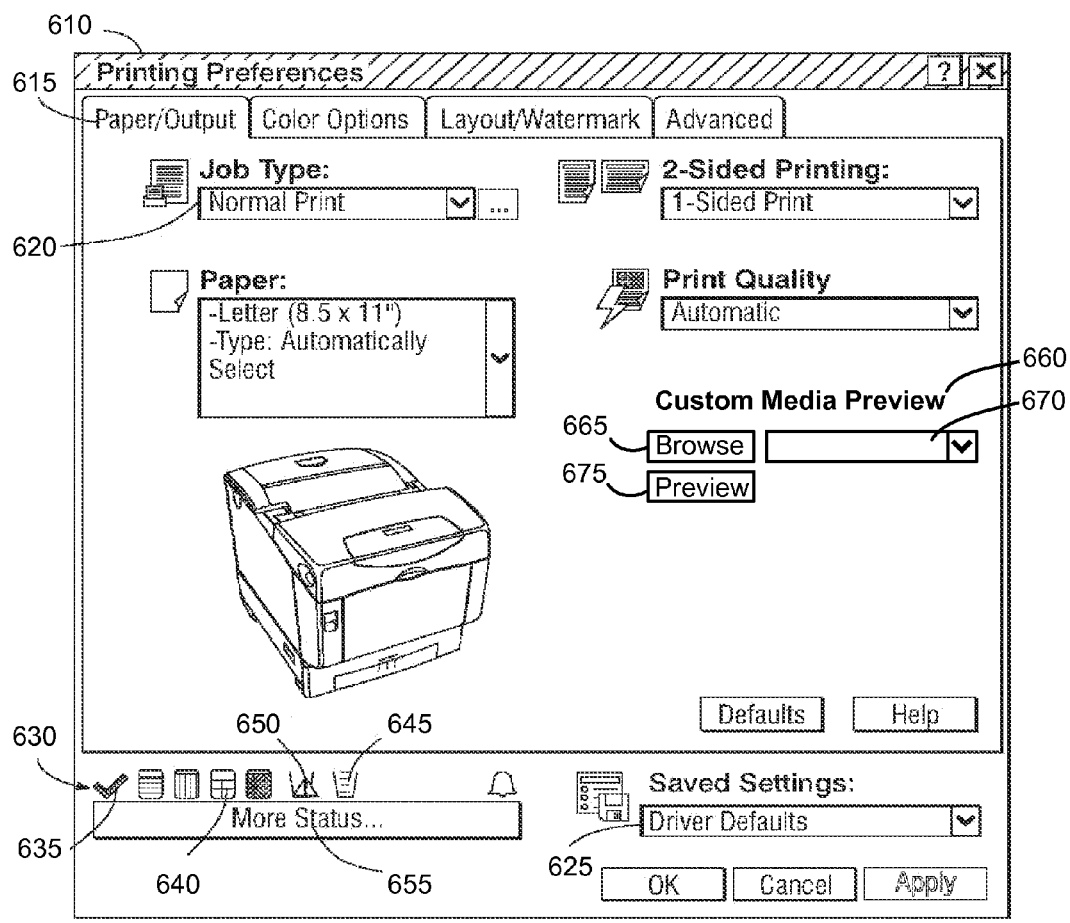
FIG. 6 is an exemplary diagram of a printer user interface that may be displayed on a display of processing device in accordance with one possible embodiment of the disclosure.

FIG. 6 is an exemplary diagram of a printer user interface 610 that may be displayed on a display coupled to processing device 130 in accordance with one possible embodiment of the disclosure. The printer user interface 610 may include one or more tabs where various options, configurations and preferences may be selected. In this example, the Paper/Output preferences tabs is shown and may include document settings 620, printer default settings 625, status bar 630 (which may include icons for printer status 635, toner status 640, paper status indicators 645, and warning indicator 650), and a more status button 655. A description of the operation of these features may be found in U.S. patent application Ser. No. 11/778,883, which is incorporated herein by reference it is entirety. A user may interact with the printer user interface 610 using any input device 360, including a mouse, a keyboard, voice, etc., for example.

The printer user interface 610 may also include custom media preview preferences 660. The custom media preview preferences 660 may include a browse button 665, a browse file window 670, and a preview button 675. In this manner, a user may select to retrieve a custom media template from memory 330 by browsing for and selecting a custom media template file using the browse button 665 and browse window

670. Once the desired custom media template file has been selected, the user may select (e.g., "click on") the preview button 675. Then, a separate window may be opened and displayed with document image appearing on the custom media template. The window may have its own window closing button and print button (should the user be happy with the preview), for example.

Figure 7:
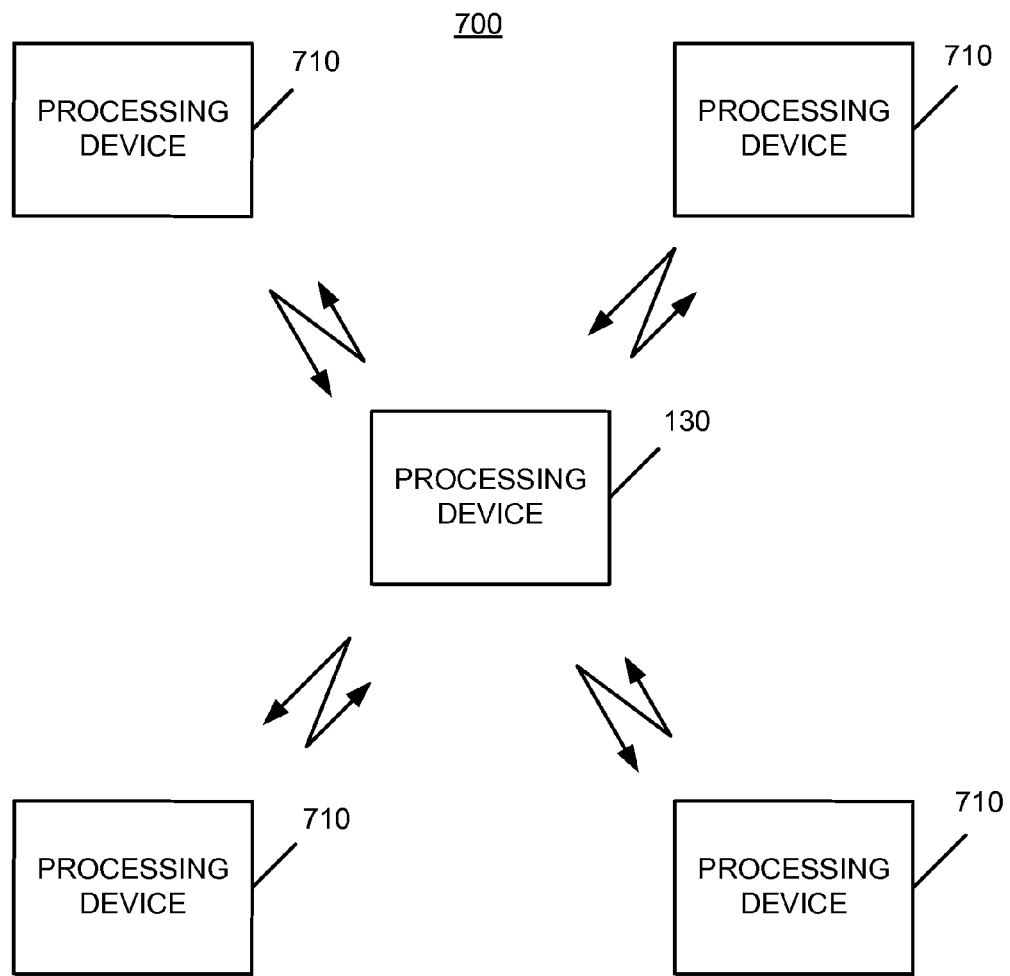
FIG. 7 is an exemplary diagram of a custom media template distribution environment in accordance with one possible embodiment of the disclosure.

FIG. 7 is an exemplary diagram of a custom media template distribution environment 700 in accordance with one possible embodiment of the disclosure. The custom media template distribution environment 700 may include the processing device 130 and one or more other processing devices 710. The customized print preview processing unit 350 of the processing unit 130 may transmit the custom print preview template to one or more other processing device 710 for use by that device.

Thus, if the processing device 130 were a performing as a server, for example, other processing devices 710 may access the custom media template or receive the custom media template by transmission from the processing device 130. This access or transmission may be direct or through a network, such as a Local Area Network (LAN), Wide Area Network (WAN), Wi-Fi, the Internet, an Intranet, etc. This process would enable other individuals at a company, firm, etc. to have access to a custom media template for print preview for company-wide or firm-wide forms, letterhead, checks, etc.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for generating a custom media template for printing on custom or preprinted media stock by an image production device, comprising:
  receiving a request to generate a custom print preview template;
  initiating a scan of the custom print preview template document by the image production device;
  receiving the scanned custom print preview template from the image production device; and
  storing the scanned custom print preview template in a memory for subsequent printing on custom or preprinted media stock.

2. The method of claim 1, wherein the request to generate the custom print preview template is received through a printer user interface.

3. The method of claim 1, further comprising:
  displaying the received scanned custom print preview template to a user on an electronic display.

4. The method of claim 1, further comprising:
  transmitting the custom print preview template to another processing device for use by that processing device for printing on custom or preprinted media stock.

5. The method of claim 1, wherein the image production device is one of a copier, a printer, a facsimile device, and a multi-function device and the method is performed by a processing device, the processing device being one of a computer, a server, a laptop, a personal digital assistant (PDA), a mobile telephone, an MP3 player, and combinations thereof.

6. A processing device that generates a custom media template for printing on custom or preprinted media stock by an image production device, comprising:
  a memory; and
  a customized print preview processing unit that receives a request to generate a custom print preview template, initiates a scan of the custom print preview template document by the image production device, receives the scanned custom print preview template from the image production device, and stores the scanned custom print preview template in the memory for subsequent printing on custom or preprinted media stock.

7. The processing device of claim 6, further comprising:
  a printer user interface, wherein the customized print preview processing unit receives the request to generate the custom print preview template through the printer user interface.

8. The processing device of claim 6, further comprising:
  an electronic display, wherein the customized print preview processing unit displays the received scanned custom print preview template to a user on the electronic display.

9. The processing device of claim 6, wherein the customized print preview processing unit transmits the custom print preview template to another processing device for use by that processing device for printing on custom or preprinted media stock.

10. The processing device of claim 6, wherein the image production device is one of a copier, a printer, a facsimile device, and a multi-function device and the method is performed by a processing device, the processing device being one of a computer, a server, a laptop, a personal digital assistant (PDA), a mobile telephone, an MP3 player, and combinations thereof.

11. A method for printing on custom or preprinted media stock using an image production device, comprising:

receiving a request to print a print job from a user, the print job involving printing of a document image on custom or preprinted media stock;

determining whether custom or preprinted media stock is required for the print job, wherein if it is determined that custom or preprinted media stock is required for the print job, determining if a request for a print preview has been received from the user, wherein if it is determined that a request for the print preview has been received from the user, prompting the user to select one of the custom media templates from one or more custom media templates stored in a memory;

receiving the user's custom media template selection and retrieving the selected custom media template from the memory;

presenting the document image on the selected custom media template in a print preview image on an electronic display;

determining whether the user has indicated that the print job is to be processed, wherein if it is determined the user has indicated that the print job is to be processed, printing the print job on custom or preprinted media stock at the image production device.

12. The method of claim 11, wherein if the user indicates that the print job is not to be processed, receiving an adjusted document image;

presenting the adjusted document image on the selected custom media template in a print preview image;

determining whether the user has indicated that the print job is to be processed, wherein if it is determined the user has indicated that the print job is to be processed, printing the print job on custom or preprinted media stock at the image production device.

13. The method of claim 11, wherein the custom media template is selected from a printer user interface.

14. The method of claim 11, wherein the print preview request is received from a printer user interface.

15. The method of claim 11, wherein the image production device is one of a copier, a printer, a facsimile device, and a multi-function device and the method is performed by a processing device, the processing device being one of a computer, a server, a laptop, a personal digital assistant (PDA), a mobile telephone, an MP3 player, and combinations thereof.

16. The method of claim 11, wherein the image production device is one of a copier, a printer, a facsimile device, and a multi-function device and the method is performed by a processing device, the processing device being one of a computer, a server, a laptop, a personal digital assistant (PDA), a mobile telephone, an MP3 player, and combinations thereof.

17. The method of claim 11, wherein if the customized print preview processing unit determines that the user indicates that the print job is not to be processed, the customized print preview processing unit receives an adjusted document image, presents the adjusted document image on the selected custom media template in a print preview image, determines whether the user has indicated that the print job is to be processed, wherein if the customized print preview processing unit determines that the user has indicated that the print job is to be processed, the customized print preview processing unit prints the print job on custom or preprinted media stock at the image production device.

18. The method of claim 11, further comprising:
a printer user interface, wherein the customized print preview processing unit receives the custom media template selection from the printer user interface.

19. The method of claim 11, further comprising:
a printer user interface, wherein the customized print preview processing unit receives the print preview request from the printer user interface.

20. A processing device that processes print jobs on custom or preprinted media stock using an image production device, comprising:
a memory; and
a customized print preview processing unit that receives a request to print a print job from a user, the print job involving printing of a document image on custom or preprinted media stock, determines whether custom or preprinted media stock is required for the print job, wherein if the customized print preview processing unit determines that custom or preprinted media stock is required for the print job, the customized print preview processing unit determines if a request for a print preview has been received from the user, wherein if the customized print preview processing unit determines that a request for the print preview has been received from the user, prompts the user to select one of the custom media templates from one or more custom media templates stored in the memory, receives the user's custom media template selection and retrieves the selected custom media template from the memory, presents the document image on the selected custom media template in a print preview image on an electronic display, determines whether the user has indicated that the print job is to be processed, wherein if the customized print preview processing unit determines the user has indicated that the print job is to be processed, the customized print preview processing unit prints the print job on custom or preprinted media stock at the image production device.

* * * * *